Nov. 15, 1960
J. I. CANTRAL
2,960,170
DISK TILLERS
Filed Sept. 27, 1955
2 Sheets-Sheet 1
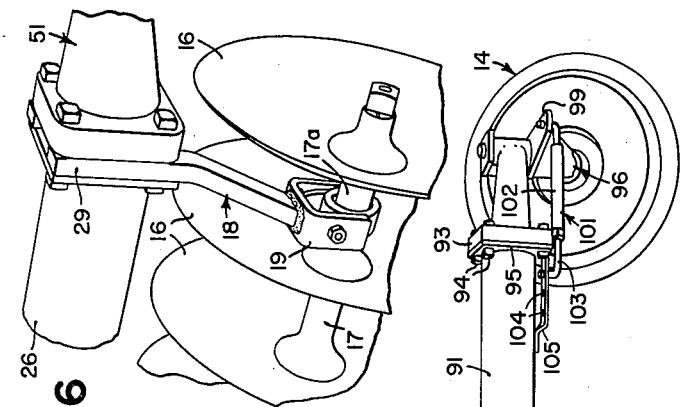
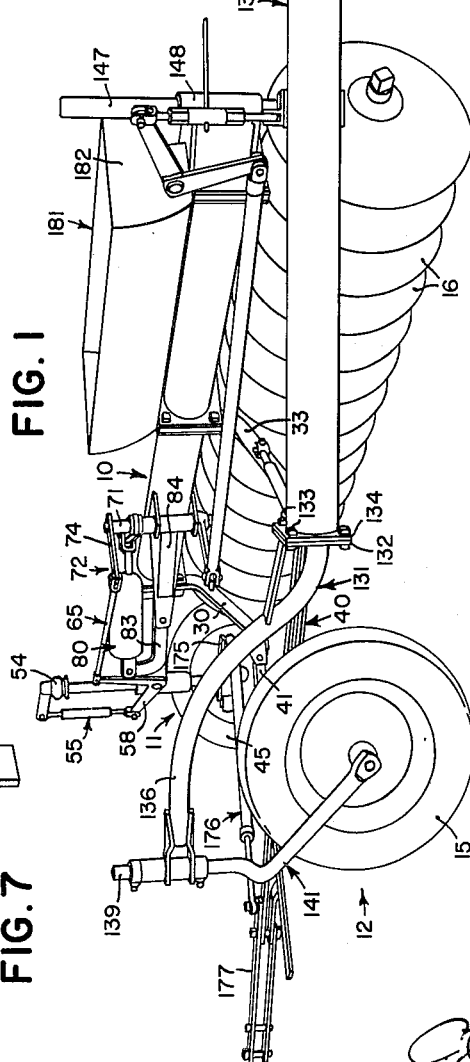
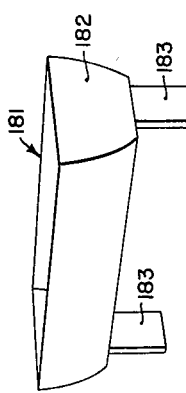
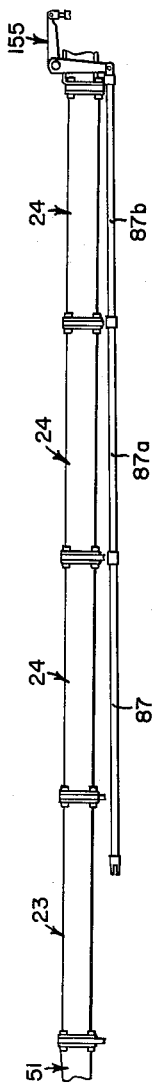
INVENTOR.
JOHN I. CANTRAL
ATTORNEYS

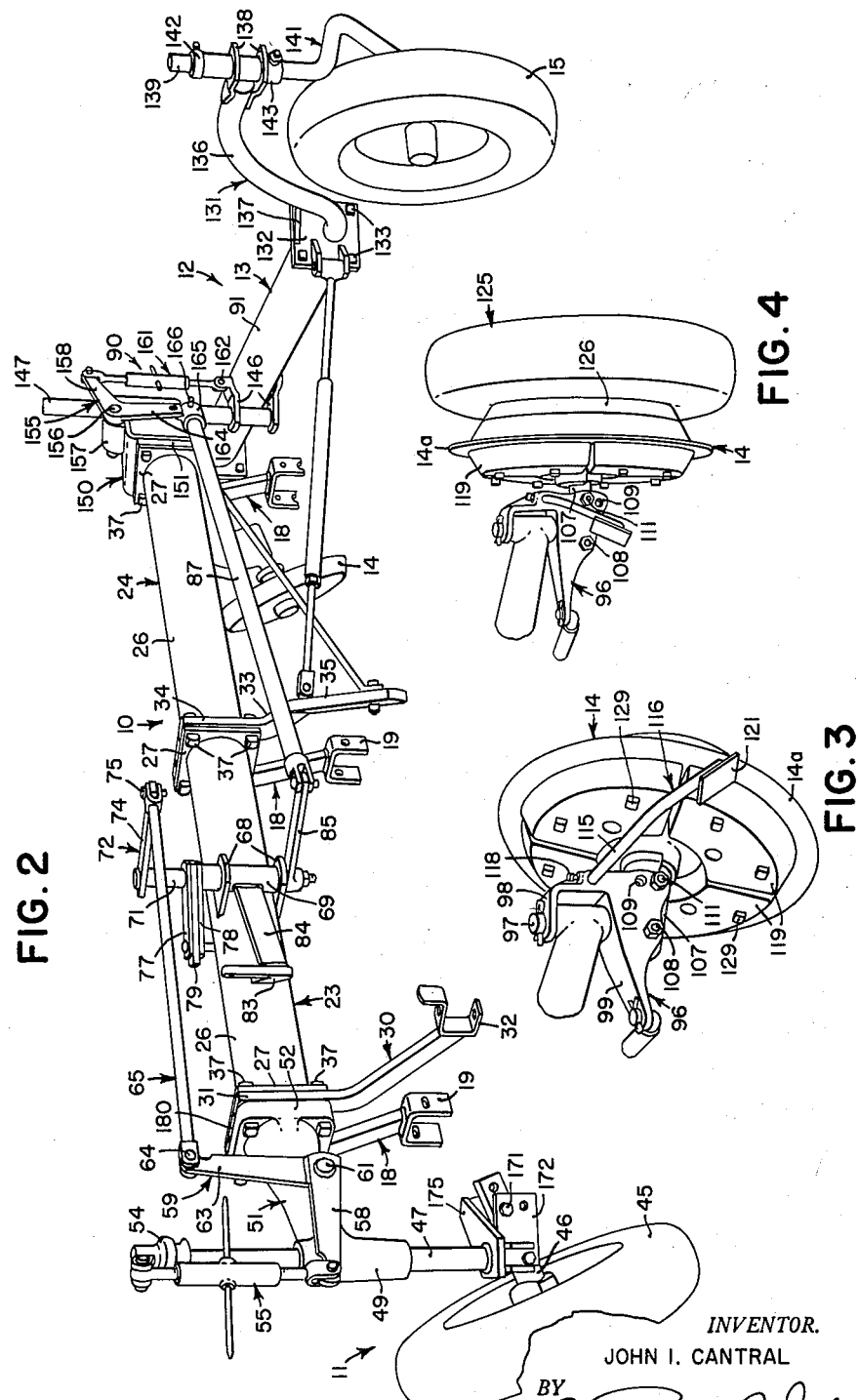

United States Patent Office 2,960,170
Patented Nov. 15, 1960

2,960,170

DISK TILLERS

John I. Cantral, Moline, Ill., assignor, by mesne assignments, to Deere & Company, a corporation of Delaware Filed Sept. 27, 1955, Ser. No. 536,970

9 Claims. (Cl. 172—407)

The present invention relates generally to agricultural implements and more particularly to ground-working implements of the type commonly known as disk tillers.

The object and general nature of this invention is the provision of a new and simplified form of disk tiller wherein the main frame of the tiller is supported for vertical adjustment relative to not only the front furrow wheel but also the rear truck of the tiller, which generally constitutes a fore-and-aft extending frame structure to which a rear furrow wheel and a land wheel are connected. A further feature of this invention is the provision of means fixing the rear end of the generally diagonal frame structure or main frame of the tiller to the rear wheel truck frame in different positions of vertical adjustment relative to the latter. More specifically, it is a feature of this invention to provide a vertical post on the rear frame structure on which the main or diagonal frame structure of the tiller is slidably disposed. A similar sliding arrangement is provided to accommodate raising and lowering the front end of the main or diagonal frame structure relative to the front wheel means.

One advantage of this arrangement is that the disk gangs may be connected directly with the frame structure, and the latter raised and lowered relative to the front wheel means and the rear wheel truck, so that when raising the frame structure and the gangs into a transport position, wherein the disks are out of contact with the ground, no lifting energy need be spent to raise the rear truck itself, particularly the longitudinal frame structure thereof, yet the weight of the latter is available to hold the disks at their operating position in the ground. This is considered to be an important advantage, in that disk tillers and like implements require considerable weight at the rear end of the implement to hold the ground-working means at the desired operating depth yet, according to the present invention, raising and lowering of the truck frame itself when shifting the working disks into and out of their transport and working positions are not required.

A further feature of this invention is the provision of a new and simplified main frame structure for disk tillers and the like in which the frame structure comprises a plurality of interconnected but detachable frame sections, whereby the size of the implement may be increased or decreased, as desired, with the standards, connecting the disk gangs with the main frame structure, and the draft transmitting bars disposed generally vertically and connected between the adjacent ends of the frame sections. As a result of this construction, the same connecting means that interconnects adjacent portions of the several frame sections also serve as means connecting the associated disk gang standard and draft bars to the main frame of the implement.

It is a further feature of this invention to provide raising and lowering means associated with the front wheel means and the rear truck means for raising and lowering the main frame relative thereto, such raising and lowering means including a rockable member mounted on the foremost section of the main frame structure and connected with the front wheel means through a compression link, the rear portion of the main frame being raised and lowered relative to the rear truck through means that includes a tension link arrangement, which may, if desired, include sectionalized link means, whereby portions of the latter may be inserted or taken out, as required, to correspond with the selected size or length of the main frame of the implement. If desired, the tension link means may include links of different sizes, corresponding to the different possible arrangements of the sectionalized main frame section, and the advantage of having a tension link extend rearwardly alongside the main frame sections is that provision may readily be made to accommodate the addition or subtraction of frame sections, which disposes the rear truck different distances from the operating member at the forward portion of the main frame, yet the raising and lowering connection associated with the rear truck is effectively operated without requiring the rigidity for such operating connection that would be necessary if the operating connection included members acting in compression.

An additional feature of the present invention is the provision of an agricultural implement such as a disk tiller in which a new and improved transport wheel is provided for the rear furrow wheel of the implement.

These and other objects and advantages of the present invention will be apparent to those skilled in the art after a consideration of the following description of the preferred structural embodiment, taken in conjunction with the accompanying drawings in which the preferred embodiment has been illustrated.

In the drawings:

Fig. 1 is a perspective view of a disk tiller in which the principles of the present invention have been incorporated, the view being taken from the left or landward side of the implement.

Fig. 2 is a fragmentary perspective view, taken from the front of the implement with a number of parts removed in order to show the frame structure and associated parts more clearly.

Fig. 3 is a fragmentary perspective view of the rear portion of the implement, showing in particular the rear furrow wheel and the mounting therefor.

Fig. 4 is a view showing the rear furrow wheel swung into a vertical position and the transport or auxiliary wheel attached thereto.

Fig. 5 is a fragmentary elevation of a main frame having a total of four frame sections.

Fig. 6 is a fragmentary perspective view of the front bearing yoke and associated parts.

Fig. 7 is a perspective view of one of the weight boxes.

Generally speaking, the disk tiller of the present invention comprises a main frame structure 10, front wheel means 11 and rear wheel means 12, preferably in the form of a rear truck 13 carrying a rear furrow wheel 14 and a front castering land wheel 15. The implement also includes a gang or gangs of disks 16 suitably carried on a gang shaft means and separated by spacing spools 17, certain of which, as at 17a in Fig. 6, are in the form of bearing means received in the lower end or yoke end 19 of generally vertically arranged disk gang standards 18, the upper ends of which are connected to and may be considered to form a part of the frame structure 10. The lower portions of the standards are shaped to extend slightly forwardly, as will best be seen from Fig. 2, so as to dispose the yoke sections 19 substantially directly underneath the main frame 10.

According to the principles of the present invention, the frame structure 10 includes a front pipe section 23 and one or more pipe sections 24. Each of the pipe sections 23 and 24 is preferably identical in general arrangement, as will be seen from Fig. 5, each including a frame member in the form of a pipe 26 to each end of which a flange 27 is fixed, as by welding or the like. Each flange 27 is generally square in configuration and is provided with bolt holes at the corners thereof. Each gang standard 18 extends generally vertically upwardly from the associated bearing spool means 17a and has an upper end portion 29 that is disposed between adjacent flanges 27 of the associated frame sections. It will be noted from the drawings that the upper end portion 29 of each standard is disposed along the rear edge of each of the associated flanges, extending vertically, and in order to fill out the opposite or forward edge portions of the associated flanges 27 a front bar 30, having a vertical section 31 serving as a spacer, is disposed between the forward edges of the associated flanges, the lower portion of the draft bar 30 extending downwardly and forwardly and provided with a hitch brace-receiving yoke 32. A second bar or brace-receiving member 33 is provided with a vertical section 34, also serving as a spacer, that is disposed between the associated flanges of the first and second frame pipe members 23 and 24, as shown in Fig. 2, the bar 33 also having a lower portion that extends downwardly and forwardly, as indicated at 35. The thickness of each of the vertical sections 31 and 34 of the bars 30 and 33 is the same as the thickness of the upper end of the associated disk standards 18. The upper ends of the disk standards 18 and the upper ends of the bars 30 and 33 are provided with openings registering with associated openings in the flanges 27 to receive interconnecting bolts 37 that extend through the flanges and associated parts and serve, when tightened, to hold the associated frame sections rigidly together.

It was mentioned above that more than one auxiliary frame section 24 may be provided where desired. Fig. 2 shows a disk tiller frame work for an implement that provides an eight foot cut. By adding one additional frame section 24, an implement is provided that will form an eleven and one half foot cut, and by providing two additional frame sections 24, as shown in Fig. 5, a fifteen foot tiller is provided. As will be seen from Fig. 1, the bar 33 is adapted to receive the main hitch member 40, the forward portion of the latter being connected by a brace bar 41 with the forward bar 30, the bar 41 being adjustably fixed by any suitable means to the forward portion of the main draft member 40.

The front furrow wheel means 11 comprises a front furrow wheel 45 mounted on the downwardly and outwardly extending axle section 46 of a spindle member 47, the upper portion of which slidably receives a sleeve-like part 49 that forms the front portion of a wheel-mounting member 51 that is equipped with a flange 52 substantially identical with the frame section flanges 27 and apertured to receive the bolts 37, whereby the wheel-mounting flange 52 may be fixed rigidly to the forward end of the adjacent frame section 23, with the front gang standard 18 and bar 30 disposed therebetween. The upper end of the spindle member 47 carries a cap 54 to which a vertically disposed turnbuckle 55 is connected. The lower end of the turnbuckle 55 is pivotally connected to the forward or outer end of the lower arm 58 of a bell crank 59 that is fixed to a stub shaft 61 rockably mounted in an apertured boss (not shown) formed in or carried by the wheel-mounting member 51. The other or upwardly extending arm 63 is apertured to receive the pin or pivot 64 by which a compression link 65 is pivotally connected with the upward arm 63 of the bell crank 59.

A pair of apertured brackets 68 are fixed to and extend generally forwardly from the pipe section 26, the brackets 68 being apertured to receive a vertical sleeve section 69, preferably welded to the brackets 68 and extending above the upper bracket 68. Rockably disposed in the sleeve 69 is a vertical shaft 71 that forms a part of a rockable member or lever 72 that is carried by the foremost frame section 23. Fixed to the upper end of the shaft section 71 is an arm 74 that is apertured at its forward end to receive a pivot 75 by which the rear end of the compression link 65 is connected with the arm 74. Upper and lower arms 77 and 78 are fixed to the shaft 71, and loosely mounted on the shaft 71 and disposed between the arm 77 and 78 is a loose arm 79 that is adapted to receive at its outer end an operating unit, such as a hydraulic ram 80 (Fig. 1), the forward end of which is connected to a bracket 83 that is fixed to the froward side of the frame part member 26 and re-enforced by a diagonal brace 84. A lower arm 85 is fixed at its rear end to the lower end of the shaft 71 and is pivotally connected at its outer or forward end to the forward end of a generally diagonal rearwardly extending tension link member 87 that extends generally alongside the rear frame section 24 to raising and lowering means 90 by which the rear end of the diagonal frame 10 is raised and lowered relative to the rear truck 13.

The rear wheel means or rear truck 13 of the disk tiller forming the subject matter of this invention includes a generally fore-and-aft extending pipe section 91 to the rear end of which a rear mounting member is fixed, the latter having a flange 93 that is secured, as by being bolted, as at 94, to a rear wheel-mounting member 95. The rear furrow wheel 14 is mounted for rotation on the lower axle section of a spindle member 96 arranged to rotate about a vertical axis defined by a vertical pin 97 that extends through upper and lower portions 98 and 99 of the member 96, which preferably is a casting. The member 96 is extended, as at 99, and apertured to receive an adjusting link 101 (Figure 1), which preferably includes a threaded sleeve 102 and a threaded rod member 103, the forward end of which is disposed in one or the other of a plurality of openings 104 formed in a bracket 105 fixed to the rear portion of the pipe section 91. The axle section referred to above is indicated at 107, Fig. 3, and is pivotally connected to the spindle member 96 by a transverse bolt 108. The member 96 has a plurality of openings 109, and the axle member 107 is correspondingly apertured, whereby a transverse bolt 111 may be arranged to hold the wheel 14 at an angle, as shown in Fig. 3, or vertically, as shown in Fig. 4. The upper portion of the spindle member 98 is provided with a transverse opening in which the shank section 115 of a scraper member 116 is disposed, being held in different positions by set screw 118. The scraper member 116 includes a blade 121 that, as shown in Fig. 3, may be held in operative relation close to or in contact with the flat portion 14a of the rear wheel 14, said flat portion being made up of a plurality of segments of flat stock, whereby, with associated wheel weights 119, the rear furrow wheel 14 may be caused to bite into the ground to hold the rear end of the tiller in the proper operating position. When the rear furrow wheel 14 is to be swung into a vertical position, as shown in Fig. 4, the set screw 118 is loosened and the scraper member 116 swung to an inoperative position.

For transport purposes, and to permit the implement to be drawn over highways, paved roads and the like, a rubber tired auxiliary or transport wheel 125 (Fig. 4) is adapted to be fixed to the wheel 14. The wheel 125 is attached to the wheel 14 by means of bolts first installed in outer wheel weights 126 so as to extend laterally outwardly, to the right as viewed in Fig. 4, and upon these bolts the wheel 125 may be mounted. As will be seen from Fig. 4, when the wheel 14 is swung up into a vertical position, the wheel 125, and not the wheel 14, supports the implement. When in transport position, the link 101 is adjusted so as to dispose the wheel 125 in a generally vertical fore and aft extending plane. If the implement is to be transported only from one field to another, the auxiliary wheel 125 may be omitted. Where additional weights are required, inner wheel weights 119 may be bolted, as at 129, to the wheel 14.

The forward end of the pipe section 91 carries a bracket 131, the rear portion of which is provided with a flange 132 that is secured, as by bolts 133, with a flange 134 fixed to the forward end of the pipe section 91. The main body portion of the bracket 131 is formed as an S-shaped bar 136, the rear portion of which may be reinforced by a brace 137 that connects the upper edge of the flange 132 with the bar section 136. The forward end of the latter section carries a pair of apertured brackets 138 in which the vertical or spindle section 139 of a caster wheel axle member 141 is disposed, being held in different vertical positions, as desired, by set screw collars 142 and 143. The caster wheel 15 is journaled for rotation on the lower part of the caster wheel axle member 141. A generally central portion of the pipe member 91 carries a pair of laterally inwardly extending apertured brackets 146 in which the lower portion of a vertical post 147 is fixedly disposed. The rear portion of the main frame 10 is mounted for vertical adjustment along the post 147, and to this end a sleeve section 148 is slidably disposed on the post 147 above the upper bracket 146, the sleeve 148 being carried by or formed as a part of a rear mounting member 150, the forward portion of which is apertured to receive bolts 37 whereby the associated flange 27 of the rearmost pipe section 26 may be rigidly connected to the bracket or mounting member 150, with the upper portion of the rearmost disk gang standard 18 clamped therebetween. A filler bar 151 is disposed between the forward edge of the rearmost flange 27 and the associated portion of the rear mounting member 150.

The rear raising and lowering means 90 includes a bell crank 155 that is fixed to a short shaft 156 that is rockably disposed in a bearing section 157 carried by or formed as a part of the rear mounting member 150. The rear or upper arm 158 of the bell crank 155 is pivotally connected to a turnbuckle unit 161, the lower end of which is pivotally connected to a bracket 162 carried by the pipe 91, the bracket 162 preferably being a part of the upper bracket 146, as will be clear from Fig. 2. The other arm 164 of the bell crank 155 is pivotally connected to a collar 165 that is secured by a pin 166 to the rear end of the tension link 87. As will be seen from Fig. 2, a pull exerted through the link 87 acts to swing the bell crank 155 in a generally clockwise direction, which acts to raise the rear end of the frame 10 relative to the truck 13.

When the implement is arranged with a plurality of two or three auxiliary frame sections 24, tension link sections 87a, and 87b, if necessary, are added to the tension link member 87 so as to provide a connection between the power actuated arm 85 and the rear bell crank 155. These auxiliary links sections are indicated in Fig. 5. It will be understood that integral tension links of different lengths may be substituted for the sectionalized links 87, 87a, etc., if desired. Preferably, there are as many link sections as there are frame sections, and the lengths of the link sections correspond to the lengths of the frame sections. The power unit 80 acts through the rotatable member 72 to exert a thrust through the compression link 65 and a pull through the tension link 87, with associated sections, for raising and lowering the front and rear ends of the main frame section 10 relative to the front and rear wheel means 11 and 12. When hydraulic fluid is locked within the unit 80, the front and rear bell cranks are held against movement, which serves to lock the main frame structure in a position of vertical adjustment relative to the front and rear wheels. Thus, the weight of the wheels, particularly the rear truck 13, is available to hold the disks 16 in their operating position, but when it is desired to raise the disk into a transport position, it is not necessary to expend energy to raise the relatively heavy truck 13.

As best shown in Fig. 2, the front wheel 45 is mounted for rotation on the pivoted axle member 46 that is held in either an angle position or a vertical position by means of a bolt 171 insertable in selected openings in the bracket 172 that is connected to the lower end of the spindle 47. For transporting the implement it is preferable to arrange the front furrow wheel 45 into a vertical position if the machine is to be moved over a substantial distance. Also secured to the lower end of the spindle 47 is a steering arm 175 that is connected by a link 176 to a hitch arm 177 that at its forward end is adapted to be connected to the towing tractor and at its rear end to the forward end of the steering link 176 and to the main hitch member 40.

The particular flange and bar construction wherein the standards 18 are clamped between the rear edges of the associated flanges 27 and the bars 30, 35 and 151 are clamped between the forward edges of the flanges 27 and associated parts provide a construction in which upwardly opening slots 180 are available. In this connection, both the standards 18 and the bars 30, 35 and 151 form spacer means between the associated flanges. These slots provide means whereby a weight box 181 may be carried on the frame of the tiller, and more than one box 181 may be used where there are a plurality of rear auxiliary frame sections 24. As will best be seen from Fig. 7, each weight box 181 includes end plates 182 that carry or are provided with downwardly extending lugs 183 that are rigid with the weight box 181 and are dimensioned so as to be disposable in the slots 180. Thus, all that it is necessary to do to attach a weight box 181 is bring the same into a position over the top of the frame 10 and then pass the depending lugs 183 downwardly into the slots 180 of the main frame. It will be seen from Fig. 1, this provides for a secure mounting of the weight box 181 in position and the weight box may readily be removed when desired.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim therefore and desire to secure by Letters Patent is:

1. A disk tiller comprising a generally diagonal frame structure, a generally fore-and-aft extending rear frame structure, said generally diagonal frame structure including a plurality of separable sections, whereby by removing one or more sections, the length of said diagonal frame structure may be reduced, a front wheel connected with the front end portion of said diagonal frame structure for generally vertical movement relative thereto, ground-engaging wheel means connected with the front and rear end portions of said fore-and-aft extending frame structure, means connecting the rear end portion of said diagonal frame structure with said fore-and-aft extending frame structure for generally vertical movement relative to the latter, and operating means connected with said diagonal frame structure and with said wheel means and said fore-and-aft extending frame structure for raising and lowering said diagonal frame structure relative to said wheel means and said fore-and-aft extending frame structure, said operating means including frame raising and lowering means connected between said fore-and-aft extending frame structure and the rear end of said diagonal frame structure, an operating part movably mounted on the forwardmost frame section, a compression link connecting said operating part with said front wheel, and tension link means extending alongside the other or others of said frame sections from said operating part to said frame raising and lowering means, said tension link means including a plurality of separable sections, corresponding in length to the lengths, respectively, of said separable frame sections, whereby as the length of the diagonal frame structure is changed by adding or taking out one or more sections the effective length of said tension link means may be varied accordingly.

2. A disk tiller comprising an elongated frame structure made up of a plurality of frame sections, each section having a generally radially outwardly extending flange at each end thereof, a plurality of gangs of disks, one gang for each frame section, a plurality of generally vertical disk gang standards, bearing means rotatably connecting said gangs with the lower end portions of said standards, the upper end portions of said standards being disposed between the rear portions of adjacent flanges of said alined frame sections and against the outer flanges of the end frame sections adjacent the rear edges thereof, bracket means including generally vertical bars disposed between the forward portions of adjacent flanges of said alined frame sections and against the outer flanges of the end frame sections adjacent the forward edges thereof, and means extending through said flanges and the upper portions of said disk gang standards and the associated bracket means for connecting the standard and bracket means with said frame sections and connecting said frame sections together in alined relation.

3. The invention set forth in claim 2, further characterized by said flanges and the associated standards and bracket means forming at least one pair of upwardly opening slots in said frame structure, and a weight box having depending flanges at the ends thereof spaced apart so as to be disposed in said slots, said flanges being of sufficient length so that by engaging in said slots, said weight box is held in position on said frame structure.

4. A disk tiller comprising a generally elongated main frame structure, comprising a plurality of interconnected alined frame sections, each section having radially outwardly extending flange means at each end, the intermediate flanges of said sections being adapted to be connected together to complete the main frame structure, a first ground-engaging wheel means for supporting the associated end of said frame structure, wheel mounting means therefor including a flange means similar to the flange means on said frame sections, and means connecting the wheel-mounting flange means with the adjacent flange means of said main frame section, a second wheel means for supporting the other end of said main frame structure, wheel-mounting means for said second wheel means, and including flange means similar to the flange means of said frame section, means connecting said last-mentioned wheel-mounting flange means with the adjacent flange means at said other end of said frame structure, and front and rear bars disposed in a generally vertical position and clamped between each front and rear meeting portions of associated pairs of flange means.

5. An agricultural implement comprising a frame structure including a first section and a plurality of one or more auxiliary frame sections, all of said sections being releasably connected in end-to-end relation, supporting wheel means connected with each of the outer ends of said frame structure for generally vertical movement relative thereto, one wheel means being connected with the outer end of said first frame section and the other wheel means being connected with the outer end of the outermost auxiliary section, and raising and lowering means carried by said supporting wheel means and said frame structure for raising and lowering the latter relative to said wheel means, said raising and lowering means comprising a lever mounted on the inner end portion of said first frame section about an axis and having a first connection at one side of said axis extending to the supporting wheel means at the outer end of said first section and acting in compression to raise the associated end of said frame structure relative to the last-mentioned supporting wheel means, and a second connection extending from said lever generally at the other side of said axis to the supporting wheel means at the other end of said frame structure, said second connection acting in tension to raise the associated end of the frame structure relative to the other supporting wheel means and including a plurality of one or more auxiliary connection sections, corresponding in length to the associated auxiliary frame sections.

6. A disk tiller comprising an elongated frame structure made up of a plurality of frame sections, each section having a generally radially outwardly extending flange at each end thereof, a plurality of gangs of disks, one gang for each frame section, a plurality of generally vertical disk gang standards, bearing means rotatably connecting said gangs with the lower end portions of said standards, the upper end portions of said standards being disposed between the rear portions of adjacent flanges of said alined frame sections and against the outer flanges of the end frame sections adjacent the rear edges thereof, filler means having the same thickness as said standards disposed between the forward portions of adjacent flanges of said alined frame sections and against the outer flanges of the end frame sections adjacent the forward edges thereof, and means extending through said flanges and the upper portions of said disk gang standards and the associated filler means for connecting the standard and filler means with said frame sections and connecting said frame sections together in alined relation.

7. The combination with an agricultural implement including an elongated frame having upwardly opening slots disposed transversely of said frame in spaced apart relation, said slots being generally vertical and parallel, and an elongated weight box having adjacent each end a downwardly extending flange, said flanges being parallel and spaced apart a distance corresponding to the distance between said slots so as to enter said slots and fasten said weight box to said frame, the cross section of each flange corresponding generally to the cross section of the associated slot, whereby the weight box is held against substantial displacement relative to the frame.

8. A disk tiller comprising an elongated frame structure made up of a plurality of frame sections, each section having a generally radially outwardly extending flange at each end thereof, a plurality of gangs of disks, one gang for each frame section, a plurality of generally vertical disk gang standards, bearing means rotatably connecting said gangs with the lower end portions of said standards, the upper end portions of said standards being disposed between the adjacent flanges of said alined frame sections at one side of the frame structure, spacer means disposed between said adjacent flanges at the other side of the frame structure, said standards and spacer means forming at least one pair of upwardly opening slots in said frame structure, and a weight box having depending flanges at the ends thereof spaced apart so as to be disposed in said slots, said flanges being of sufficient length so that by engaging in said slots, said weight box is held in position on said frame structure.

9. A disk tiller comprising an elongated frame structure made up of a plurality of frame sections, each section having a generally radially outwardly extending flange at each end thereof, means interconnecting the end flanges of adjacent frame sections, said means including spacer means disposed, respectively, between the front and rear portions of said adjacent flanges so that the space between said spacer means forms at least one pair of upwardly opening slots in said frame structure, and a weight box having depending flanges at the ends thereof spaced apart so as to be disposed in said slots, said flanges being of sufficient length so that by engaging in said slots, said weight box is held in position on said frame structure.

References Cited in the file of this patent

UNITED STATES PATENTS

| | | |
|---|---|---|
| 197,159 | Mowrey | Nov. 13, 1877 |
| 340,236 | Meyer | Apr. 20, 1886 |
| 368,926 | Bates | Aug. 30, 1887 |
| 555,144 | Wicks | Feb. 25, 1896 |
| 604,854 | Case | May 31, 1898 |
| 1,358,939 | Davis | Nov. 16, 1920 |
| 1,747,052 | Cody | Feb. 11, 1930 |
| 2,184,428 | Lindgren et al. | Dec. 26, 1939 |
| 2,196,347 | Von Meyenburg | Apr. 9, 1940 |
| 2,618,213 | Welcher et al. | Nov. 18, 1952 |
| 2,662,460 | Klemm et al. | Dec. 15, 1953 |
| 2,669,171 | Silver et al. | Feb. 14, 1954 |
| 2,907,396 | Gardner | Oct. 6, 1959 |